United States Patent [19]
Seifert

[11] 3,849,302
[45] Nov. 19, 1974

[54] METHOD AND APPARATUS FOR SCREENING PAPER FIBER STOCK

[75] Inventor: Peter Seifert, Middletown, Ohio

[73] Assignee: The Black Clawson Company, Middletown, Ohio

[22] Filed: Sept. 12, 1972

[21] Appl. No.: 288,288

[52] U.S. Cl................. 209/273, 209/306, 209/379, 210/415
[51] Int. Cl............................................. B07b 1/20
[58] Field of Search .......... 209/273, 300, 305, 306, 209/270, 303, 304; 210/415

[56] References Cited
UNITED STATES PATENTS

| | | | |
|---|---|---|---|
| 1,856,176 | 8/1959 | Trimbey | 209/273 |
| 2,900,077 | 8/1959 | Sandison | 209/273 X |
| 2,975,899 | 3/1961 | Cannon | 209/273 |
| 3,363,759 | 1/1968 | Clarke-Pounder | 209/273 |
| 3,394,809 | 7/1968 | Hunter | 209/306 X |
| 3,581,893 | 6/1971 | Rich | 210/415 X |
| 3,581,903 | 6/1971 | Hozz | 210/415 |
| 3,586,172 | 6/1971 | Young | 209/273 |
| 3,680,696 | 8/1972 | Morin | 209/273 |
| 3,726,401 | 4/1973 | Bolton | 209/273 |

FOREIGN PATENTS OR APPLICATIONS
727,010  2/1966  Canada.................................. 162/4

Primary Examiner—Robert Halper
Attorney, Agent, or Firm—Biebel, French & Bugg

[57] ABSTRACT

In screening apparatus for paper fiber stock incorporating a cylindrical slotted screen member having generally axially extending slots and a rotor supporting vanes movable in the supply chamber, the circumferential spacing of the slot is greater than the average fiber length of the stock being screened, the rotor vanes are spaced from the screen member by a substantial distance (one-eighth to one-half inch) to establish a tubular layer of stock of corresponding radial thickness adjacent the screen member, the rotor is operated at high speed to develop strong hydraulic shear forces in the tubular layer of stock causing tangential orientation of predominantly two-dimensional contaminant particles, and the stock is continuously recirculated in the supply chamber to prevent undue increase in the consistency of the stock in the tubular layer, thereby providing for high quality screening at high consistencies (as much as 5%) and high throughput rates.

16 Claims, 1 Drawing Figure

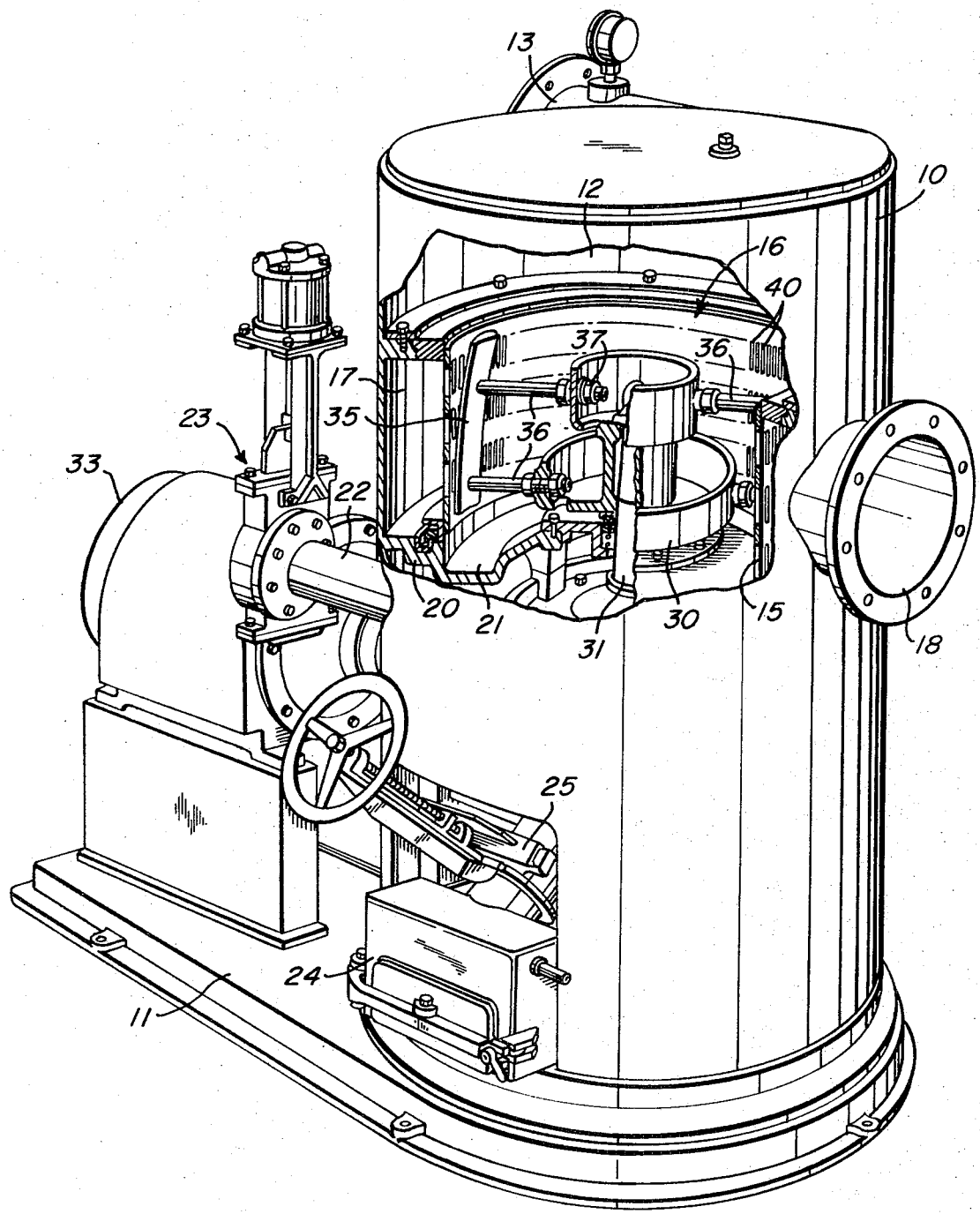

METHOD AND APPARATUS FOR SCREENING PAPER FIBER STOCK

BACKGROUND OF THE INVENTION

Paper mills have for many years made extensive use, for the cleaning of paper making stock, of screening apparatus embodying a cylindrical perforate screen member defining supply and accepts chambers on the opposite sides thereof in a closed housing and provided with a rotor member which operates in one of the chambers to keep the screen perforations open and free from solid material tending to cling to the screen surface. Commonly, the stock or furnish is delivered to the supply chamber adjacent the end of the screen member, and the material rejected by the screen member is collected and discharged from the opposite end of the screen member.

The assignee of this invention has manufactured and sold many such screens, originally in accordance with Staege Pat. No. 2,347,716, and more recently in accordance with Martindale Pat. No. 2,835,173, the latter construction being characterized by a rotor comprising bars or vanes of air-foil section in closely spaced but non-contacting relation with the surface of the screen member. More specifically, the vanes have been moved along the screening surface at relatively low speeds, e.g. in the range of 1,250 – 2,500 feet per minute with the clearance between the supply side of the screen member and the nearest portion of the vanes being in the range of .030 – .060 inch.

The art has experimented widely with detailed variation in screens of the above type, including variations in the vane shape and other forms of rotor, and particularly in the size, spacing and configuration of the perforations in the screen member. In recent years, such screens have been offered to the trade wherein the screen member is provided with elongated slots rather than round holes, typical such constructions being shown in Lamort Pat. Nos. 3,161,708 and 3,174,622 and Holz Pat. No. 3,581,983.

SUMMARY OF THE INVENTION

The present invention is directed to the provision of a screen of the type outlined above wherein the screen member is slotted and which will offer important practical advantages over the previously available similar screens, particularly in the following respects:

a. High throughput rate per unit area of screen cylinder surface, e.g. as high as 40 tons per day per square foot;
b. high feed consistencies, e.g. as high as 5%;
c. relative insensitivity to fluctuations of feed consistency, furnish type and/or flow rate;
d. the ability to remove all three major types of contaminant particles, namely slivers and flakes, which are predominantly two dimensional, and the more three dimensional particles which resemble cubes or spheroids;
e. effective screening action over the entire area of the slotted screen member, with minimum tendency to undesirable thickening of the furnish adjacent the end of the screen member nearest to the reject outlet;
f. economy of maintenance and operation, especially from the standpoint of the power requirements with relation to throughput; and
g. mechanical reliability, especially from the standpoint of minimum damage to working parts.

In general it appears immaterial to the practice of the invention whether the supply chamber be on the inside or outside of the screen member, but it is essential that the rotor include bars or vanes which are located on the supply side of the screen member and extend the full length of the screen member. It is also essential that the speed of the rotor be substantially increased as compared with conventional practice to establish a correspondingly high peripheral speed for the vanes. For example, and in contrast to the range of approximately 1,250 – 2,200 feet per minute prescribed in the Martindale patent, outstanding results in the practice of the invention have been obtained with the vanes traveling at speeds of the order of 5,000 feet per minute. This is a practical limit for economic reasons although in principle, considerably higher speeds (e.g. 12,000 feet per minute) can be used and will permit operation at correspondingly higher consistencies and throughput rates.

Another particularly important characteristic of the invention is that the rotor vanes should be spaced substantially further from the adjacent surface of the screen member than in the prior practice. To illustrate, in contrast with the range of .030 – .060 inch specified in the Martindale patent, outstanding results have been obtained in the practice of the invention with this spacing in the range of one-eighth to one-half inch. In general, optimum results from the standpoint of screening effectiveness with high consistencies and throughput rates have been obtained with the maximum rotor speed and vane spacings noted herein. Decreased vane to screen spacings can be used successfully at lower vane speeds, with corresponding reduction in permissible maximum consistency, capacity and throughput while still obtaining effective screening.

In accordance with the invention, it is important that the slots extend substantially axially of the cylindrical screen member; the individual slot width and the circumferential spacing of the slots are other important features. Ideally, the slot width should be less than the final thickness of the sheet into which the furnish is to be made. This would mean widths as low as .003 – .006 inch, and screens embodying the invention can be operated with such fine slots. However, the capacity per unit of screening area of a screen member having slots substantially less than .010 inch in width will be relatively low, and as a practical and economic matter, slot widths in the range of approximately .010 – .030 inch are preferred. The choice of a specific dimension is related to the product for which the furnish is intended, such as a slot width of .010 inch for fine printing papers, .014 inch for waste paper and ground wood stocks, and .018 inch for stock to be made into top liner.

The circumferential spacing of the slots is a particularly important factor, with greater slot spacings being preferred for long fiber stocks and for the screening of high consistency furnishes. The spacing between adjacent slots can substantially exceed the fiber length of a given furnish, and spacing greater than fiber length is generally beneficial to overall slotted screen operation. In contrast to the common practice of relatively closely spaced slots, e.g., eight to twelve slots per inch, preferred spacing for the practice of the invention is five slots per inch for slots of the above width range, and spacings throughout a range of two to seven slots per inch can be used.

Under these dimensional and operational conditions, several important results are accomplished. The first is to establish a tubular layer of furnish immediately adjacent the supply side of the screen member which is of substantial thickness, up to a maximum determined by the spacing between the rotor vanes and the screen member. Movement of fiber through the screen slots will take place from this layer, but due to a number of factors, including particularly the frictional resistance of the edges of the slots to the passage of fiber therethrough, water will flow through the slots faster than the fiber. Since this water will be replaced by furnish at the feed consistency, the layer will be generally of a higher consistency than the balance of the furnish in the supply chamber. This increase in consistency will of course also be contributed to by the presence of reject particles in the annular layer.

A particularly significant result of the conditions outlined above is the creation of a substantially tangentially oriented steady field of hydraulic shear in the tubular layer of furnish between the path of the rotor vanes and the inlet side of the slotted screen member. Thus, that portion of this tubular layer contiguous to the surface of the screen member will have a circumferential velocity which approaches zero, because substantial portions thereof will pass through the slots, and their velocity will be essentially radial. Additionally, this layer will be subject to skin friction with respect to the imperforate surface portions of the screen member. On the other hand, the portion of the layer nearest to the vane path will travel circumferentially at a high velocity, approaching that of the vanes themselves. The intermediate portion will therefore travel at this velocity, varying from a maximum near the vane path to a minimum near the relatively zero velocity portion next to the screen member.

The importance of the shear forces created as just described derives from the effect which they have on the predominantly two-dimensional contaminant particles in the furnish, namely the slivers and flakes. These particles are induced to align themselves generally tangentially of the screen surface, a tendency which is increased because of the increased consistency of this annular layer. Since the screening slots extend substantially axially of the screen member, the tangential alignment of the slivers and flakes will be substantially at right angles to the slots and will cause these aligned particles to travel past the slots and therefore to remain on the inlet side of the screen member. If the main velocity component of the circulating layer is not substantially tangential, it may be advantageous to orient the slots at a slight angle to the rotor axis and therefore more nearly at right angles with the direction of circulating flow.

It should be noted at this point that slotted screens wherein the slots are generally circumferentially aligned, as well as other types of slotted screens having rotor vanes on the accepts side of the screening member, do not provide the advantages outlined in the previous paragraph. On the contrary, the tangential alignment of predominantly two-dimensional contaminant particles which contributes to the benefits of this invention will have the opposite effect in such screens in that it will align slivers and flakes with the screening slots for passage therethrough. It should also be noted that it is important to the practice of the invention to assure minimum disturbance of the shear field in the tubular layer of stock between the vane path and the screen member, for example, by constructing the screen member with the surface of its inlet side smooth and free of protrusions, and also by using smooth vanes which extend the full length of the screen member and thus minimize the effect of localized turbulence produced by the ends of the vanes.

A further desirable result provided by the invention can best be explained by noting first that in the conventional practice, with the rotor vanes traveling in closely spaced relation to the surface of the screen member, the pressure pulse between the leading edge of each vane and the adjacent surface of the screen member tends to create excessive flow through the slots, which can result in an undesirable extent of dewatering of the fiber in that immediate vicinity and mechanical smearing of the fiber over the slots. The large increase in the spacing of the vanes from the screen surface in accordance with the invention eliminates these undesirable effects, but at the same time, the high speed for the vanes prescribed by the invention creates a sufficient suction pulse between the trailing end of each vane and the screen member to keep the screen surface clean.

In connection with the point just discussed, it is pertinent that in screens of this general type wherein rotor vanes operate in closely spaced relation to the screen member, as in the Martindale patent, there is a tendency for the screen member to fracture, apparently because of the pressure pulses produced by the traveling vanes. It would seem likely that at the substantially higher rotor speeds prescribed by this invention, increased screen breakage problems could result, but the contrary has occurred. Apparently the substantial increase in spacing between the vanes and the screen member significantly reduces the intensity of the pulses on the screen member, and the strength of the latter is also enhanced by the substantially increased slot spacings preferred for the practice of the invention.

It is essential that provision be made for progressively eliminating reject particles from the annular layer of furnish adjacent the screen member, since they would otherwise tend to cause continuing increase in the consistency of this layer. In particular, with the discharge outlet for reject material at the opposite end of the chamber from the feed inlet port, the concentration of reject particles along the portion of the screen member nearest the discharge outlet can increase the consistency of the slurry in that area to such extent that passage of fiber therefrom through the screening slots becomes minimal. This problem is solved in accordance with the invention by causing the furnish to recirculate generally axially of the screen member from the portion of the annular layer nearest the discharge end of the supply chamber back in the opposite direction through the interior of the chamber to the inlet end of the chamber.

One means by which recirculation is effected as just described is by the use of rotor vanes which are generally helically curved, as shown in the Martindale patent, and therefore effectively inclined with respect to the rotor axis. In that patent, this vane configuration is relied upon to cause reject particles to migrate by reason of the suction effect created along the trailing edge of each vane, and this result does occur with the vanes spaced closely from the screen member. With the vanes spaced farther away from the screen member in accordance with the invention, however, the primary force causing migration of reject particles toward the discharge end of the chamber is the downward component given to the annular layer of the stock as a whole by reason of the high speed of the forwardly tilted vanes. Under these conditions, it may be desirable to incline the slots to run approximately parallel with the vanes.

It is practicable to effect the desired internal recirculation by providing the rotor with impeller means arranged to cause axial flow away from the reject discharge station, in the annular portion of the supply chamber radially inwardly of the vane path, in which case straight axially aligned vanes may be used. An alternative approach is to provide an exterior circuit for recirculating reject flow from the reject discharge port to the feed inlet port. Since screens of this type normally operate with a continual reject bleed, such recirculation would ordinarily require only a by-pass line and some increase in the rate of reject removal.

The combination of all of these factors results in accomplishment of all of the objectives listed at the outset of this section. In particular, not only does this combination result in highly effective cleaning action as outlined, but the effective throughput is enhanced by the high consistencies at which a screen can operate successfully in accordance with the invention. More specifically, and in contrast with consistencies of 0.5 – 0.8% which are conventionally used with slotted screens in the paper industry, the invention can be practiced effectively with consistencies as high as 5%, so long as the operating speed of the rotor and the space between the rotor vanes and the screen member are maintained in the high ends of the ranges outlined above.

BRIEF DESCRIPTION OF THE DRAWING

The drawing is a perspective view, partly broken away, of the screening apparatus embodying the invention.

DESCRIPTION OF THE PREFERRED EMBODIMENT

The screening apparatus shown in the drawing is constructed generally in accordance with the Martindale patent, with certain exceptions in accordance with the invention. It comprises a main housing 10 on a base 11, and in the upper end of the housing is an inlet chamber 12 having a tangential inlet port 13 to which the furnish supplied under pressure as is customary with such screening apparatus. A cylindrical screen member 15 divides the interior of the housing below chamber 12 into a central supply chamber 16 and an accepts chamber 17 having an outlet port 18.

The bottom wall 20 of the supply chamber 16 includes a trough 21 leading to a discharge port 22 provided with a control valve assembly 23 which can be preset to provide a desired continual bleed of reject-rich stock. Heavy particles which settle into the trough 21 drop therefrom to the heavy trash collection box 24 by way of manually controlled valve 25. The liquid flow from port 22 is commonly subjected to further screening after dilution, or it may in part be recirculated to inlet port 13 as described above.

A rotor 30 is supported on a drive shaft 31 in the center of the supply chamber 16 and is driven through suitable gearing or belts by a motor 33 also mounted on the base 11. Vanes or bars 35, shown as of the same configuration as in the Martindale patent, are mounted on the rotor 30 by support rods 36. Adjustable connections 37 between the inner ends of rods 36 and rotor 30 provide for positioning the vanes 35 in properly spaced relation with the inner surface of screen member 15, a space in the range of three-sixteenths to one-half inch being preferred depending upon circumferential speed for the reasons already explained. The vanes 35 extend the full length of the screening surface of screen member 15, and they are helically curved and so arranged that the upper end of each vane is spaced forwardly of the lower end in the direction of rotation of the rotor, shown as clockwise. Two vanes 35 are shown, but other numbers can be used, and in general a greater number, e.g. four, may make possible improved operation at higher consistencies.

The screen member 15 is provided with multiple screening slots 40 extending substantially parallel with its axis and the axis of rotor 30. These slots as shown as arranged in circumferential rows, with the individual slots being 2 inches in length and the rows spaced 1 inch apart axially of member 15, but neither of these dimensions nor the specific arrangement is critical. Contrary to the conventional practice wherein the slot spacing is substantially the same as the average fiber length to be processed, optimum results in accordance with the invention have been achieved with substantially greater spacing than the average fiber length, as exemplified by the preferred example of five slots per inch and approximately 5% open area. In addition, if the other principles of the invention outlined above are observed, it is practicable to use a screen member wherein the slots are as fine as .003 inch in width, thereby obtaining extremely high quality screening although necessarily with some reduction in throughput as compared with wider slots under the same operating conditions.

The operating conditions for a screen as described in connection with the drawing should be controlled in accordance with the explanation under the "Summary of the Invention" heading. For a screen wherein the screen member 15 is 24 inches in diameter, outstanding results from the standpoint of capacity have been obtained with furnish of 2 to 3% consistency and with the rotor operating 800 rpm, which results in a vane speed of about 5,000 feet per minute. For increased economy of operation, with respect to power requirements, good results can be obtained at lower speeds, with the lowest practical rate for the rotor being preferably not less than about 500 rpm, giving a vane speed of about 3,000 feet per minute. Higher capacity with excellent results can be obtained with higher speeds, up to 2,000 rpm or about 12,000 feet per minute, which also makes it practical to handle stock at higher consistencies, up to 5%.

While the method and form of apparatus herein described constitute preferred embodiments of the invention, it is to be understood that the invention is not limited to these precise method and form of apparatus, and that changes may be made therein without departing from the scope of the invention.

What is claimed is:

1. The method of screening a dilute suspension of paper fiber stock, comprising the steps of a. continuously supplying the stock to one end of an annular supply chamber having as one wall thereof a cylindrical screen member having multiple slots therethrough extending generally parallel with the axis thereof,
b. maintaining a pressure difference from said supply chamber to the accepts side of said screen member to cause passage of accepted stock through said slots,
c. causing the stock in said supply chamber to form a tubular layer of substantial thickness and of substantially the same length as said screen member immediately adjacent the surface of said screen member in said supply chamber,
d. continuously rotating vane means in said supply chamber in a circular path adjoining said tubular layer at a sufficiently high speed to create a substantially tangentially oriented steady hydraulic shear field in said tubular layer of stock with shear rates sufficiently high to cause elongated contaminant particles to be aligned generally tangentially of said screen member and thereby to flow past rather than through said slots,
e. said path being located in a radially intermediate position in said supply chamber and said vane means being spaced angularly from each other within said path to provide for circulation of stock between said tubular layer and the space on the opposite side of said path from said tubular layer by way of the gaps between said vane means,
f. continuously removing from the other end of said screen chamber a portion of said stock including such contaminant particles, and
g. continuously recirculating stock from said other end of said supply chamber to said one end thereof.

2. The method defined in claim 1 wherein the circumferential spacing between adjacent said slots is substantially greater than the average fiber length in the furnish being screened.

3. The method defined in claim 1 wherein the circumferential spacing between adjacent said slots is such that the range of slots per inch is substantially two to seven.

4. The method defined in claim 2 wherein the width of individual said slots is in the range of approximately .003 to .030 inch.

5. The method defined in claim 2 wherein the consistency of said stock is in the range of substantially 2 to 5%.

6. The method defined in claim 2 wherein the thickness of said tubular layer of stock is in the range of substantially one-eighth to one-half inch.

7. The method defined in claim 1 wherein said shear field is created by vane means rotating in said supply chamber at relatively high speed in the range of substantially 3,000 to 12,000 feet per minute.

8. The method defined in claim 7 wherein the consistency of said stock is in the range of substantially 2 to 5%.

9. The method defined in claim 7 wherein the circumferential spacing between adjacent said slots is substantially greater than the average fiber length in the furnish being screened.

10. The method defined in claim 9 wherein the thickness of said tubular layer of stock is in the range of substantially one-eighth to one-half inch.

11. Screening apparatus for paper fiber stock comprising:
a. a housing
b. means including a cylindrical screen member within said housing separating the interior thereof into an annular supply chamber and an accepts chamber on opposite sides of said screen member,
c. said screen member having multiple substantially parallel slots therethrough extending generally parallel with the axis thereof,
d. inlet means for supplying the stock to one end of said supply chamber for passage through said slots to said accepts chamber,
e. rotor means including vanes located for movement along a circular path in said supply chamber in angularly spaced relation with each other and in a radially intermediate position in said supply chamber to provide a space in said supply chamber to be filled with stock on the opposite side of said path from said screen member,
f. means maintaining said vanes a substantial radial distance from the adjacent surface of said screen member to establish a continuous tubular layer of stock adjacent said surface and of a maximum corresponding radial thickness which is connected with said space through the gaps between adjacent said vanes,
g. means for driving said rotor at a rate sufficient to cause said vanes to travel at relatively high speed along said path and thereby to cause said stock layer to circulate along said screen member surface at a correspondingly high speed and also around said vanes, and
h. means for continuously withdrawing a portion of the stock from the opposite end of said supply chamber from said inlet means.

12. Screening apparatus as defined in claim 11 further comprising means for continuously recirculating stock from said other end of said supply chamber to said one end thereof.

13. Screening apparatus as defined in claim 11 wherein the circumferential spacing between adjacent said slots is such that the range of slots per inch is substantially two to seven.

14. Screening apparatus as defined in claim 12 wherein the circumfenential spacing between adjacent said slots is such that the range of slots per inch is substantially two to seven.

15. Screening apparatus as defined in claim 14 wherein said radial distance between said vanes and said screen member is in the range of substantially one-eighth to one-half inch, and wherein said driving means are capable of causing said vanes to travel in the range of substantially 3,000 to 12,000 feet per minute.

16. Screening apparatus as defined in claim 12 wherein the width of individual said slots is in the range of approximately .003 to .030 inch, and wherein the circumferential spacing between adjacent said slots is such that the range of slots per inch is substantially two to seven.

* * * * *